US005511699A

United States Patent [19]

Tepic

[11] Patent Number: 5,511,699

[45] Date of Patent: Apr. 30, 1996

[54] MANUALLY OPERATED TOOL MECHANISM

[75] Inventor: Slobodan Tepic, Davos, Switzerland

[73] Assignee: AO Research Institute, Davos, Switzerland

[21] Appl. No.: 309,946

[22] Filed: Sep. 21, 1994

[30] Foreign Application Priority Data

Sep. 27, 1993 [AT] Austria .................................... 1940/93

[51] Int. Cl.$^{6}$ .................................................... G01F 11/00

[52] U.S. Cl. ............................................ 222/326; 222/391

[58] Field of Search .................................... 222/325, 326, 222/327, 386, 391

[56] References Cited

U.S. PATENT DOCUMENTS

| | | | |
|---|---|---|---|
| 2,530,359 | 11/1950 | Peterson | 222/327 X |
| 2,582,156 | 1/1952 | Peterson | 222/327 |
| 2,726,802 | 12/1955 | Jones | 222/391 X |
| 4,009,804 | 3/1977 | Costa et al. | 222/391 |
| 4,135,644 | 1/1979 | Pacetti | 222/81 |
| 4,338,925 | 7/1982 | Miller | 128/92 E |
| 4,566,610 | 1/1986 | Herb | 222/327 X |
| 5,052,243 | 10/1991 | Tepic | 74/523 |

FOREIGN PATENT DOCUMENTS

| | | | |
|---|---|---|---|
| 0108584 | 5/1984 | European Pat. Off. . | |
| 1543996 | 7/1967 | France . | |
| 703780 | 2/1954 | United Kingdom . | |
| 1011470 | 12/1965 | United Kingdom | 222/391 |
| 8901322 | 2/1989 | WIPO . | |

*Primary Examiner*—Joseph A. Kaufman
*Attorney, Agent, or Firm*—Friedrich Kueffner

[57] ABSTRACT

A manually operated tool of the type in which a grip is pivotally mounted in a housing displacing a push rod mounted in the housing in an axial direction and in a stepwise manner. The push rod extends through at least a pair of canting blocks arranged between bearings supporting the push rod. A spring resting on the housing acts on the portions of the canting block through which the push rod extends. The force applied by the spring on the canting blocks is directed against the direction of displacement of the push rod. An adjusting force periodically exerted by the grip acts on the outer portions of the canting blocks remote from the push rod. At least one braking block is provided for holding the push rod.

12 Claims, 1 Drawing Sheet

Fig. 1
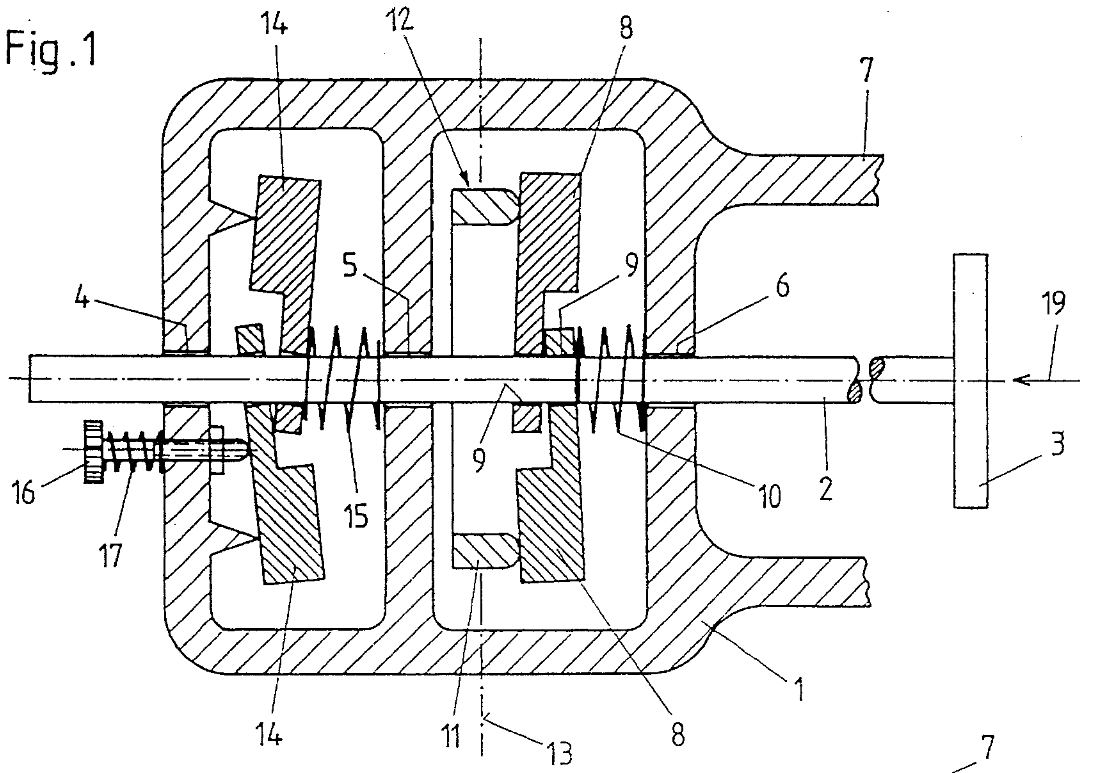
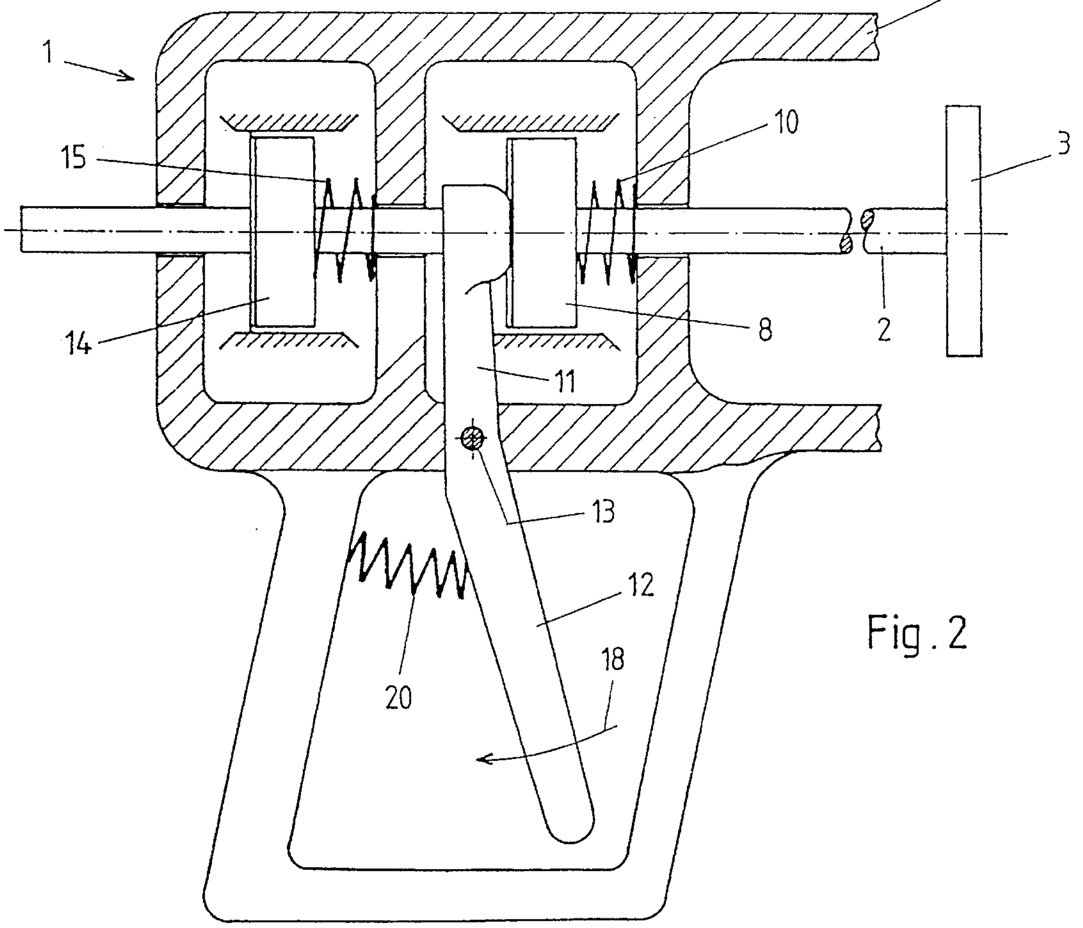
Fig. 2

MANUALLY OPERATED TOOL MECHANISM

BACKGROUND OF THE INVENTION

1. Field of the Invention

The present invention relates to a manually operated tool of the type in which a grip is pivotally mounted in a housing, wherein the grip serves to displace a push rod mounted in the housing in axial direction and in a stepwise manner. The push rod extends through at least one canting block arranged between bearings supporting the push rod. A spring resting on the housing acts on the portion of the canting block through which the push rod extends. The force applied by the spring on the canting block is directed against the direction of displacement of the push rod. An adjusting force periodically exerted by the grip acts on the outer portion of the canting block remote from the push rod. At least one braking block is provided for holding the push rod.

2. Description of the Related Art

Known in the art are various embodiments of manually operated tools with a grip which is pivotable relative to a pistol-like housing of the tool and which serves to move a push rod mounted in the housing in a stepwise manner and in axial direction. Such manually operated tools are described and illustrated, for example in the following publications: British. Patent 703,780; U.S. Pat. No. 4,135,644; U.S. Pat. No. 5,052,243; European Application 108,584; and WO 89/01322.

In manually operated tools of the above-described type, the push rod which carries a piston at its end is usually used for pressing a substance contained in a cartridge out of the cartridge, wherein the cartridge is mounted in or attached to the housing of the tool. By actuating the grip, the push rod including the piston is forced in a stepwise manner into the cartridge and the substance contained in the cartridge is pressed out. Tools of this type are used, for example, in building construction for applying sealing materials, however, other types of applications for these tools are known in the art.

As described in European Application 108,584 and U.S. Pat. No. 4,135,644, for axially displacing the push rod by a periodic movement of the pivotable grip, a toothing is provided on the push rod which is in engagement with a pawl connected to the grip. However, since substantial forces occur at this location of engagement, the components which mesh with each other are quickly worn, so that the tool becomes useless.

As a further development of these tools, as described in British Patent 703,780; U.S. Pat. No. 5,052,243; and WO 89/01322, the push rod was constructed with a smooth surface and a canting block was provided acting on the push rod, wherein the canting block is actuated directly by the grip or through a transmission. The canting block is pressed against a stop by means of a helical spring through which the push rod extends. For example, the stop is the grip when the grip is in its position of rest. When the grip is pivoted, the canting block is inclined relative to the axis of the push rod, so that the canting block is clamped against the push rod and moves the push rod as a result. This mechanism is provided between two bearings which support the push rod.

The possibility described above for displacing the push rod has been found useful. However, it should be noted in this connection that the actuation of the grip and the resulting load acting on the components which are in engagement with each other causes a significant bending stress to act on the portion of the push rod extending between the two bearings. The reaction forces caused by this bending stress in the bearings must be overcome manually, so that a significant portion of the manually applied force must be utilized for overcoming the frictional forces and deformation forces. Without doubt, this is disadvantageous and impairs the efficiency of the tool.

SUMMARY OF THE INVENTION

Therefore, it is the primary object of the present invention to improve a manually operated tool of the above-described type in such a way that the manually applied forces are utilized as efficiently as possible, i.e., as completely as possible, as a pushing force for the push rod.

In accordance with the present invention, the aforementioned object is met by providing at least a pair of canting blocks which are arranged symmetrically relative to the axis of the push rod. The displacement force to be applied by the grip acts on both canting blocks at the outer portions thereof.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is a top view, partially in section, of a manually operated tool according to the present invention, wherein the essential components for moving the push rod are shown in detail; and FIG. 2 is a side view, partially in section, of the tool of FIG. 1.

DETAILED DESCRIPTION OF THE PREFERRED EMBODIMENTS

As illustrated in the drawing, the tool used, for example, for pressing sealing substances out of cartridges, includes a pistol-like housing 1 in which a push rod 2 with a piston 3 is axially displaceably mounted. The push rod 2 is supported by three bearings 4, 5 and 6 which are part of the housing 1. A frame 7 of the housing serves to receive and mount the cartridge, not shown, which contains the sealing substance to be pressed out.

Within the housing 1, the push rod 2 extends through two canting blocks 8 which are arranged symmetrically relative to each other with respect to the axis of push rod 2. Each canting block 8 is constructed essentially as a parallelepiped plate which in one portion thereof has an opening or bore 9 whose diameter is slightly greater than the diameter of the push rod 2. In those portions of the canting blocks 8 in which the bores 9 for the push rod 2 are provided and with which they overlap each other, the parallelepiped plates are recessed in the manner of a step and have a smaller thickness than in those portions which are remote from the push rod 2. A helical spring 10, through which the push rod 2 extends, rests with one end against the housing 1 and with its other end against one of the canting blocks 8. The grip 12 is pivotable about the axis 13. The grip 12 has fork-type arms 11 which rest against the outer portions of the two canting blocks 8 on the side facing away from the spring 10. An imaginary connecting line between the two points of contact extends essentially parallel to the pivot axis 13 of the grip 12.

In order to hold the push rod 2 in its forwardly moved position against the axial reaction force acting on the push rod 2, a pair of braking blocks 14 are arranged also symmetrically relative to the axis of the push rod 2. In a position of rest of the braking blocks 14, the braking blocks 14 are held by a helical spring 15 which rests against one of the braking blocks 14, on the one hand, and against a portion of the housing 1, on the other hand. The braking blocks 14 are constructed identically to the canting blocks 8. The outer portions of the braking blocks 14 rest against bearings which are part of the housing. A shifting pin 16 mounted in the housing extends parallel to the push rod 2. The shifting pin 16 is displaceably mounted against the force of a spring 17 and rests with its inner end against one of the pair of braking blocks 14.

In the illustrated embodiment, of the arms 11 of the grip 12 act directly on the canting blocks 8. However, it is also within the scope of the present invention to provide a transfer mechanism between the grip 12 and the canting blocks 8, possibly with a suitable transmission ratio.

In the initial position, the piston 3 or the push rod 2 is located on the left hand side as seen in FIGS. 1 and 2. When the grip 12 of the pistol-like housing 1 is pivoted against the force of the spring 20 as shown by arrow 18, the arms 11 of the canting blocks 8 are canted or inclined against the force of the spring 10 and are placed with frictional engagement against the push rod 2, so that the push rod is moved to the right by a dimension which corresponds to the chord length of the arc traveled by the arms 11. This movement is not counteracted by the braking blocks 14 which have only the spring 15 acting on them. When the grip 12 is released and returns into its initial position because of the force of the spring 20 acting on the grip, the canting blocks 8 are forced back into the position shown in FIG. 1 by the pretensioned spring 10. The reaction force of the substance contained in the cartridge, not shown, acting in the direction of arrow 19 on the piston 3 tends to displace the push rod 2 toward the left. However, this movement is blocked by the braking blocks which are under the influence of the force of the spring 15. This is because the braking blocks are canted or inclined as a result of the force of the spring 15 relative to the push rod 2 and hold the push rod 2 in a frictionally engaging manner. The push rod 2 including piston 3 is moved toward the right in a stepwise manner by periodic movements of the grip 12. Once the piston has reached its end position on the right and is to be returned into its initial position, the braking blocks 14 are slightly pivoted against the force of the spring 15 by pressing the shifting pin 16, so that the frictional engagement between the braking blocks 14 and the push rod 2 is canceled and, consequently, the push rod 2 can be pulled back manually.

As a result of the symmetrical arrangement of the canting blocks 8 and the braking blocks 14, the forces acting on the push rod 2 are directed practically only in a direction extending parallel to the axis, so that not only a deformation of the push rod but also a non-uniform load application on the bearings are prevented and, thus, the forces applied manually through the grip 12 are efficiently utilized for advancing the push rod 2. The longitudinal axes of the two canting blocks 8, i.e., the axes extending parallel to the plane of the drawing as seen in FIG. 1, include in the illustrated embodiment an angle of 180° with each other. This is also true for the pair of braking blocks 14. It is within the scope of the present invention to arrange the pairs of canting blocks 8 and/or also the braking blocks 14 in such a way that the axes thereof include an obtuse or acute angle with each other. However, in that case, the object of the invention, i.e. to keep the push rod 2 free of bending forces as much as possible, is achieved only to a limited extent.

The invention is not limited by the embodiments described above which are presented as examples only but can be modified in various ways within the scope of protection defined by the appended patent claims.

I claim:

1. A manually operated tool comprising a housing, a push rod having an axis and a diameter, a plurality of bearings mounted in the housing, the push rod being supported by the bearings so as to be axially movable in the housing, a pivotable grip for moving the push rod in an axial displacement direction, a pair of canting blocks mounted between the bearings and arranged symmetrically relative to each other with respect to the push rod axis, each canting block having a first portion, the first portion defining an opening having a diameter, the push rod extending through the opening, wherein the diameter of the opening is slightly greater than the diameter of the push rod, and a second portion remote from the push rod, further comprising a spring mounted in the housing for biasing the first portions of the pair of canting blocks in a direction opposite the displacement direction, the grip comprising means for transmitting a force applied to the grip to the second portions of the canting blocks, and at least one braking block acting on the push rod for preventing the push rod from being moved in the direction opposite the displacement direction, wherein the first portions of the canting blocks overlap, the canting blocks being constructed as plate shaped members, the first and second portions each having a thickness, wherein the thickness of the first portions is smaller than the thickness of the second portions.

2. The manually operated tool according to claim 1, wherein the means of the grip for applying force on the second portions of the canting blocks is fork-shaped and contacts the second portions of the canting blocks in two points of contact, the grip being pivotable about a pivot axis, wherein an imaginary connecting line between the points of contact extends essentially parallel to the pivot axis of the grip.

3. The manually operated tool according to claim 1, comprising a pair of braking blocks arranged symmetrically relative to each other with respect to the push rod.

4. The manually operated tool according to claim 3, wherein the braking blocks have longitudinal axes, and wherein the longitudinal axes extend at an angle of 180° relative to each other.

5. The manually operated tool according to claim 1, wherein the push rod has an end, a piston being attached to the end of the push rod, a cartridge for receiving the piston being attached to the housing.

6. The manually operated tool according to claim 1, wherein the canting blocks have longitudinal axes, and wherein the longitudinal axes extend at an angle of 180° relative to each other.

7. A manually operated tool comprising a housing, a push rod having an axis and a diameter, a plurality of bearings mounted in the housing, the push rod being supported by the bearings so as to be axially movable in the housing, a pivotable grip for moving the push rod in an axial displacement direction, a pair of canting blocks mounted between the bearings and arranged symmetrically relative to each other with respect to the push rod axis, each canting block having a first portion, the first portion defining an opening having a diameter, the push rod extending through the opening, wherein the diameter of the opening is slightly greater than the diameter of the push rod, and a second portion remote from the push rod, further comprising a spring mounted in the housing for biasing the first portions of the pair of canting blocks in a direction opposite the displacement direction, the grip comprising means for transmitting a force applied to the grip to the second portions of the canting blocks, and at least one braking block acting on the push rod for preventing the push rod from being moved in the direction opposite the displacement direction, wherein the first portions of the canting blocks overlap, the canting blocks being constructed as parallelepiped shaped members, the first and second portions each having a thickness, wherein the thickness of the first portions is smaller than the thickness of the second portions.

8. The manually operated tool according to claim 7 wherein the means of the grip for applying a force on the second portions of the canting blocks is fork-shaped and contacts the second portions of the canting blocks in two points of contact, the grip being pivotable about a pivot axis, wherein an imaginary connecting line between the points of contact extends essentially parallel to the pivot axis of the grip.

9. The manually operated tool according to claim 7, comprising a pair of braking blocks arranged symmetrically relative to each other with respect to the push rod.

10. The manually operated tool according to claim 9, wherein the braking blocks have longitudinal axes, and wherein the longitudinal axes extend at an angle of 180° relative to each other.

11. The manually operated tool according to claim 7, wherein the push rod has an end, a piston being attached to the end of the push rod, a cartridge for receiving the piston being attached to the housing.

12. The manually operated tool according to claim 7, wherein the canting blocks have longitudinal axes, and wherein the longitudinal axes extend at an angle of 180° relative to each other.

* * * * *